May 28, 1935.  C. W. SINCLAIR  2,003,055

BRAKE DRUM CONSTRUCTION

Filed April 18, 1932  2 Sheets-Sheet 1

Inventor
Charles W. Sinclair

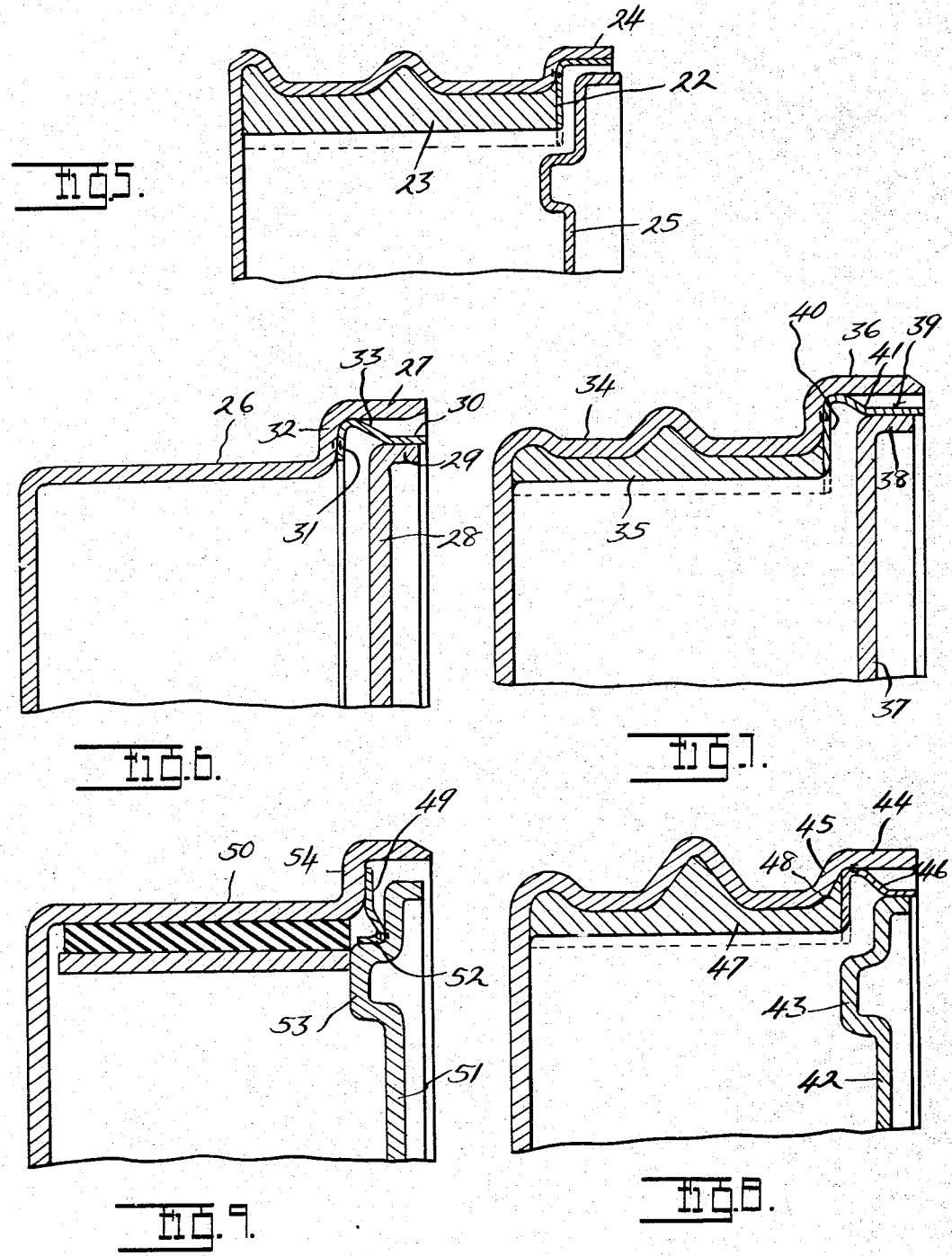

Patented May 28, 1935

2,003,055

UNITED STATES PATENT OFFICE 2,003,055

BRAKE DRUM CONSTRUCTION

Charles W. Sinclair, Detroit, Mich., assignor, by mesne assignments, to The Kelsey-Hayes Wheel Company, Detroit, Mich., a corporation of Delaware Application April 18, 1932, Serial No. 605,955

8 Claims. (Cl. 188—218)

The invention relates to brake drum constructions and has for one of its objects to provide an improved arrangement of brake drum and back plate for securing an effective seal therebetween. Other objects are to provide an improved arrangement embodying a shield to protect the joint between the brake drum and the back plate; to provide a composite brake drum so constructed as to secure an improved seal; and to provide a construction in which the retainer for the brake drum liner also functions as the shield.

These and other objects of the invention will become apparent from the following description, taken in connection with the accompanying drawings, in which Figure 1 is an elevation of a brake drum construction, showing an embodiment of my invention;

Figures 3, 4, 5, 6, 7, 8 and 9 are views similar to Figure 2, showing other embodiments of my invention.

Figure 1:
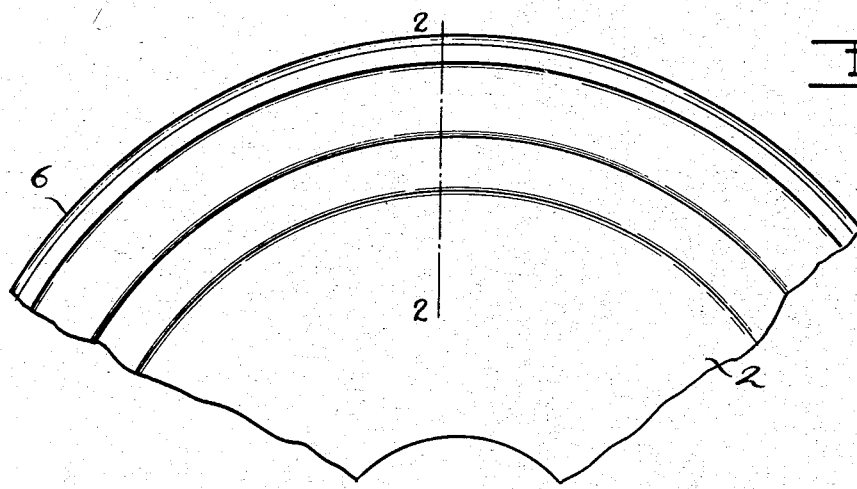
Figure 2:
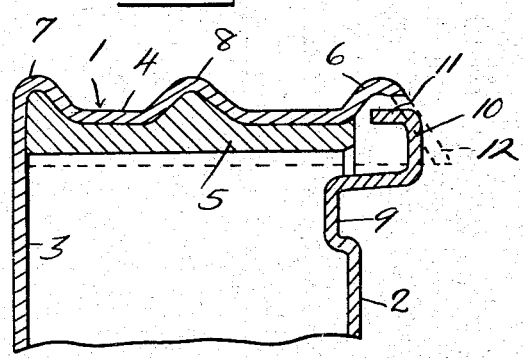
Figure 2 is a cross section on the line 2—2 of Figure 1.

Figures 1 and 2 show a brake drum construction designed particularly for use with motor vehicles and comprising the brake drum 1, which is revoluble, and the back plate 2, which is stationary. The brake drum comprises the sheet metal and preferably sheet steel shell having the web 3 and the integral peripheral annular flange 4 and the cast metal liner 5 within the shell. This liner is preferably centrifugally cast within the shell and is preferably formed of cast iron. The annular flange 4 has at its free edge the integral reinforcing rib 6 and may also have other integral reinforcing ribs 7 and 8, if desired. The back plate is preferably formed of sheet metal or sheet steel and pressed or rolled to shape and this back plate is formed with the forwardly offset annular depression 9 and the rearwardly offset channel portion 10, the latter having its outer side wall forming the forwardly extending annular flange 11 at the periphery of the back plate. The annular depression 9 is located within the liner 5 and is adapted to engage a brake member, such as a brake shoe, adapted to cooperate with the liner. The annular channel portion 10 is located at the end of the liner 5 and is within and encircled by the reinforcing rib 6, sufficient clearance being provided between the brake drum and more particularly its liner and reinforcing rib and the back plate to take care of variations in manufacture and relative movement of these parts in operation. The arrangement is such that the brake drum extends over and protects the back plate and forms therewith an effective seal and furthermore the annular channel portion of the back plate cooperates with the liner of the brake drum to form an enlarged annular space forming part of the seal.

The brake drum is made by originally forming the annular flange 4 with the inwardly and rearwardly inclined annular flange 12 connecting into the reinforcing rib 6. This inclined flange extends a sufficient distance to form a retainer for the molten metal which forms the liner 5 during the centrifugal casting of this liner within the brake drum shell. The casting is carried out at temperatures such as to secure effective fusing or molecular bonding between the adjacent surfaces of the brake drum shell and the liner. After the molten metal has cooled, the inclined flange 12 and the adjacent end portion of the liner are cut away or machined to form the space within the annular flange and, more particularly, the reinforcing rib at its free edge to receive the back plate. The inner face of the liner is also cut away or machined and suitably finished to form the brake engaging surface.

Figure 3:
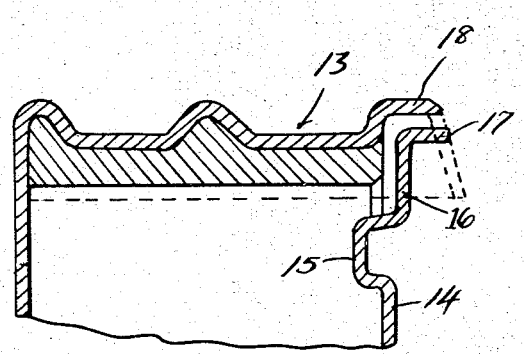

Figure 3 discloses another modification in which the brake drum 13 is formed in substantially the same manner as the brake drum 1, but the back plate 14 is provided with a different peripheral cross section than the back plate 2. This back plate 14 has the annular reinforcing depression 15 for engaging and positioning the brake member and has radially outwardly beyond this annular depression the radially extending portion 16 and the peripheral rearwardly extending annular flange 17. The reinforcing rib 18 at the free edge of the brake drum shell substantially completely encircles the annular flange 17 and serves in forming an effective labyrinth seal.

Figure 4:
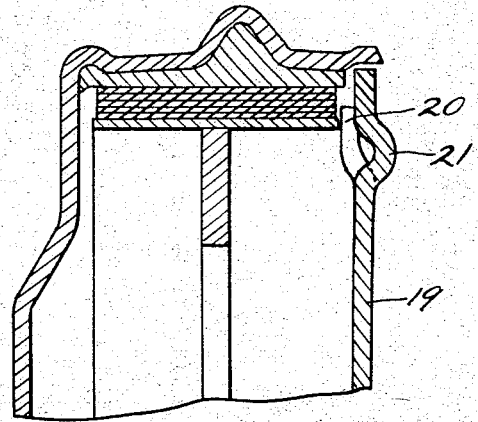

Figure 4 discloses a modification of Figure 3 in which the back plate 19 is provided with the annular series of forwardly extending depressions 20 within the liner of the composite brake drum for engaging the brake member. This back plate is also provided with the annular series of oppositely extending depressions 21 which serve with the depression 20 to reinforce the back plate.

In the modification disclosed in Figure 5, the composite brake drum is provided with the flanged ring 22 which serves to retain the molten metal during the centrifugal casting of the liner 23. This ring is permanently secured, as by welding, within the reinforcing rib 24 at the free edge of the brake drum shell and has a radially inwardly extending flange projecting beyond the inner face of the shell to retain the molten metal. This flange and the inner face of the liner may be suitably cut away and finished. The back plate 25 is formed in the same manner as the back plate 14 and is encircled by the brake drum and cooperates therewith and, more particularly, with the retainer to form an effective labyrinth seal.

Figure 6 discloses another modification in which the brake drum is formed of sheet metal and preferably sheet steel and its annular flange 26 has its inner face directly engageable with the brake member. This annular flange is formed at its free edge with the reinforcing rib 27 which is adapted to extend axially over and encircle the back plate 28 including its peripheral rearwardly extending annular flange 29. 30 is an annular shield of angular cross section and is resilient and formed of sheet metal. This shield is located within the space between the axially overlapping portions of the brake drum and back plate and has the radially extending flange 31 which is suitably permanently secured to the radially outwardly extending portion 32 of the reinforcing rib 27 as by welding. The shield also has the axially extending resilient portion 33 which encircles the annular flange 29 of the back plate and preferably contacts therewith, but exerts but relatively light pressure thereon.

In the modification shown in Figure 7, the brake drum is a composite brake drum having the shell 34 and the centrifugally cast liner 35. The shell has at its free edge the reinforcing rib 36 which extends axially over and encircles the back plate 37 with its peripheral rearwardly extending annular flange 38. The annular shield 39 located in the space between the brake drum shell and, more particularly its free edge reinforcing rib, and the back plate and more particularly its peripheral annular flange has the radially extending flange 40 which is permanently secured as by welding to the reinforcing rib 36 and which extends radially inwardly beyond the inner face of the annular flange of the shell to serve as a retainer during the centrifugal casting operation for the molten metal which forms the liner 35. This shield also has the axially extending resilient flange 41 which is adapted to extend adjacent to the peripheral annular flange 38 and contact therewith.

Figure 8 discloses a modification of Figure 7, differing mainly in that the back plate 42 is formed with the forwardly offset annular depression 43 which reinforces the back plate and is also adapted to engage the brake member within the brake drum. Also in this modification the annular reinforcing rib 44 at the free edge of the brake drum shell has an inclined side wall 45 and the combined retainer and resilient shield 46 is permanently secured within this rib in a manner such that the centrifugally cast liner 47 has an annular V-shaped portion or rib 48 between the inclined side wall of the reinforcing rib and the radially extending flange of the combined retainer and shield.

Figure 9 discloses a modification in which there is an annular sheet metal shield 49 located between the brake drum 50 and the back plate 51. This shield has an annular or axially extending flange 52 which is seated upon the outer face of the annular depression 53 in the back plate. The shield is permanently secured to the back plate as by welding and has a radially extending flange which is adapted to extend adjacent to and preferably contact with the radially outwardly extending wall 54 of the reinforcing rib at the free edge of the annular flange of the brake drum shell.

What I claim as my invention is:

1. In a brake drum construction, the combination with a revoluble brake drum and a back plate encircled by said brake drum, of a shield secured to and revoluble with said brake drum and extending axially between said brake drum and back plate.

2. In a brake drum construction, the combination with a revoluble brake drum and a back plate encircled by said brake drum, of a shield secured to the brake drum within the latter and revoluble with said brake drum and having an axially extending portion adjacent to said back plate.

3. In a brake drum construction, the combination with a revoluble brake drum and a back plate encircled by and spaced from said brake drum, of a shield secured to and revoluble with said brake drum and extending within the space between said brake drum and back plate and encircling a portion of said back plate.

4. In a brake drum construction, the combination with a back plate, of a revoluble brake drum comprising an annular flange, a liner within said flange, and a retainer for said liner permanently secured to said flange and providing a space within said flange receiving said back plate.

5. In a brake drum construction, the combination with a back plate, of a revoluble brake drum comprising an annular flange encircling said back plate, a liner within said flange, and a retainer for said liner permanently secured to said flange and forming a shield extending adjacent to said back plate.

6. In a brake drum construction, the combination with a back plate, of a revoluble brake drum comprising an annular flange encircling said back plate, a liner within said flange, and a retainer for said liner permanently secured to said flange and having an axially extending portion adjacent to said back plate.

7. In a brake drum construction, the combination with a brake drum and a back plate encircled by and spaced from said brake drum, of a shield within the space between said brake drum and back plate and secured to one of said members and extending adjacent to the other.

8. In a brake drum construction, the combination with a back plate, of a revoluble brake drum comprising an annular flange, a liner within said flange, and a retainer for the liner permanently secured to the drum and extending adjacent to the back plate to form a shield between the latter and drum.

CHARLES W. SINCLAIR.